United States Patent [19]

Sato et al.

[11] 4,438,385

[45] Mar. 20, 1984

[54] AUTOMATIC VOLTAGE REGULATION SYSTEM FOR AC GENERATOR

[75] Inventors: Hiroyasu Sato; Kazuaki Yamamoto, both of Hitachi; Hiroaki Aotsu, Nakaminato, all of Japan

[73] Assignee: Hitachi, Ltd., Tokyo, Japan

[21] Appl. No.: 380,263

[22] Filed: May 20, 1982

[30] Foreign Application Priority Data

May 26, 1981 [JP] Japan ................................. 56-78656

[51] Int. Cl.³ .......................... H02P 9/00; H02P 9/10
[52] U.S. Cl. ....................................... 322/28; 322/23; 322/24; 322/73
[58] Field of Search ................................. 322/17–21, 322/25, 28, 72, 73, 100, 29, 23, 24; 307/87

[56] References Cited

U.S. PATENT DOCUMENTS 4,322,630  3/1982  Mezera et al. ................ 307/87 X
4,326,159  4/1982  Aotsu et al. ........................ 322/19
4,329,637  5/1982  Kotake et al. .................... 322/28 X
4,399,397  8/1983  Kleinschmidt, Jr. ............. 322/29 X

*Primary Examiner*—R. J. Hickey
*Attorney, Agent, or Firm*—Antonelli, Terry & Wands

[57] ABSTRACT

An output voltage of an AC generator is produced through a full-wave rectifier and converted into a digital signal by an A/D converter. This digital signal is compared with a reference signal, and in accordance with the difference therebetween, the firing angle of a thyristor is controlled to regulate the field current. Synchronous point detectors detect a synchronous point of the output voltage of the AC generator. A microprocessor computes a firing angle of the thyristor in accordance with the difference between the digital signal and the reference signal and produces a signal representing the computed firing angle upon detection of the synchronous point. The thyristor is fired at the firing angle computed by the microprocessor.

5 Claims, 7 Drawing Figures

AUTOMATIC VOLTAGE REGULATION SYSTEM FOR AC GENERATOR

The present invention relates to an automatic voltage regulation system for an AC generator in which the field current is controlled by use of a thyristor.

In an analog-type automatic voltage regulation system, the terminal voltage of an AC generator is fed back by a feedback circuit, and a difference between the terminal voltage and a reference voltage produced from a reference voltage circuit is amplified by an error amplifier. In accordance with the magnitude of the output of the error amplifier, an automatic pulse phase shifter controls the firing angle of a thyristor. As a result, the field current of the AC generator is controlled thereby to effect voltage regulation. Such a system is disclosed, for example, in Japanese Patent Laid-Open No. 128506/77.

This automatic voltage regulation system of analog type is complicated in circuit configuration and requires a considerable space for installation. Further, any change of circuit constants of the system is made by change of hardware of each element with difficulty.

An object of the present invention is to provide an automatic voltage regulation system for an AC generator which obviates the above-mentioned problems and in which by use of a microprocessor, the circuit configuration is simplified thereby to simplify the change of circuit constants.

In order to achieve this object, according to the present invention, there is provided an automatic voltage regulation system comprising synchronous point detector for detecting a synchronous point of an output voltage of an AC generator, a microprocessor for computing the firing angle of a thyristor in accordance with the difference between the voltage detected by the voltage detector and a reference voltage and producing a firing angle computed upon detection of the synchronous point, and firing controller for turning on the thyristor at the firing angle computed by the microprocessor.

Figure 1:
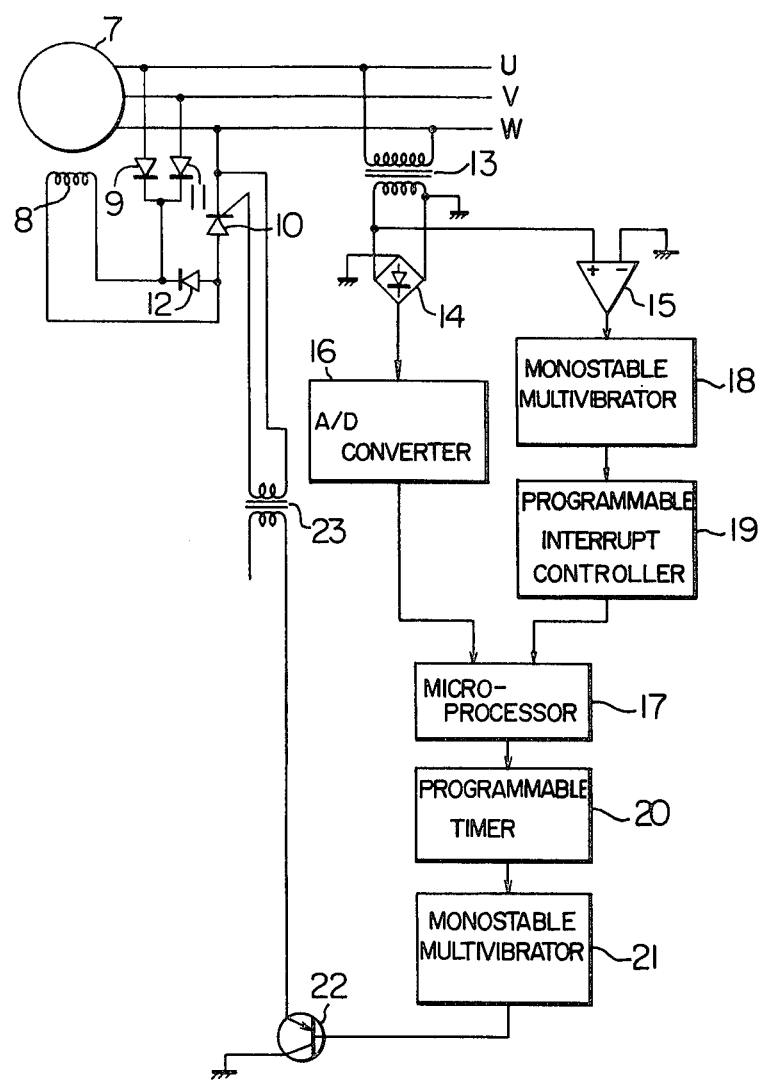
FIG. 1 is a block diagram showing an embodiment of the present invention.

In FIG. 1, a field winding 8 of a three-phase AC generator 7 is supplied with a UW interphase voltage through a diode 9 and a thyristor 10, and a VW interphase voltage through a diode 11 and the thyristor 10, so that the firing of the thyristor 10 causes a current to flow in the field winding 8. A diode 12 is for absorbing the reverse electromotive force generated in the field winding 8.

A transformer 13 takes out the UW interphase voltage and applies it to a full-wave rectifier 14 and a comparator 15. The full-wave rectifier 14 full-wave rectifies the UW interphase voltage. An A/D converter 16 is for digitally converting the full-wave rectification voltage and applying it to a microprocessor 17. The comparator 15 is for detecting a zero-crossing point of the UW interphase voltage as a synchronous point, and upon a slight rise of the UW interphase voltage from zero level, applies a high-level output to a monostable multivibrator 18. The monostable multivibrator 18 produces a pulse in response to a leading edge of the output of the comparator 15. In response to this pulse, a programmable interrupt controller 19 applies an interruption signal to the microprocessor 17.

Figure 2:
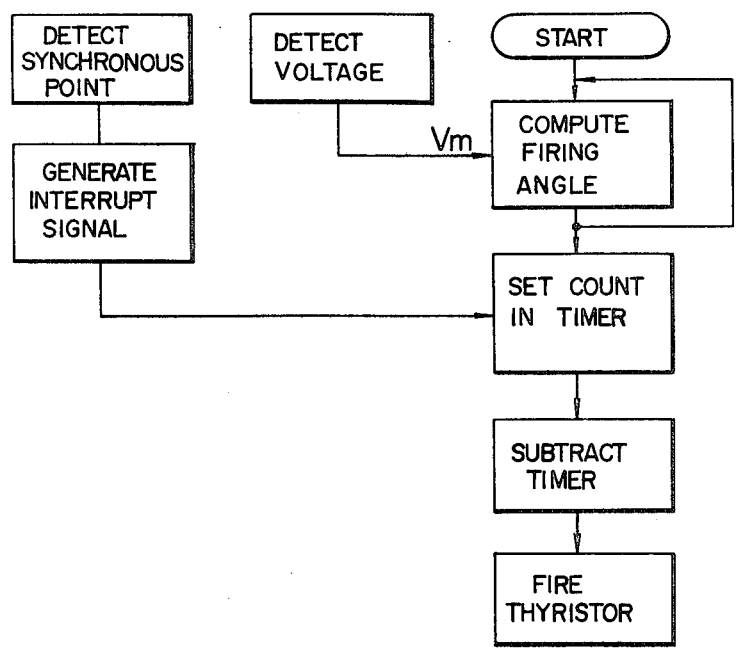
FIG. 2 is a flowchart for firing control of the thyristor shown in FIG. 1.
Figure 3:
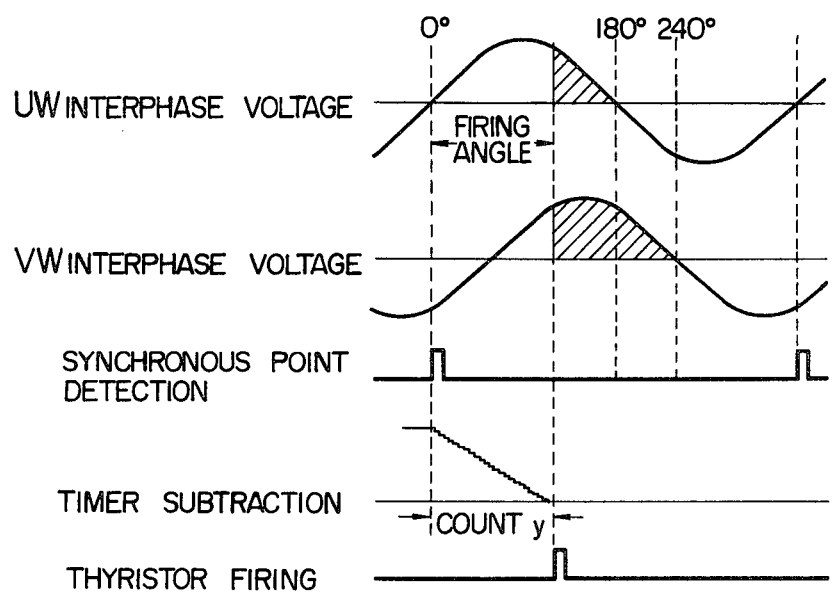
FIG. 3 is a diagram showing operating waveforms produced at various parts in firing control of the thyristor shown in FIG. 1.

The microprocessor 17 fetches a voltage from the A/D converter 16 at regular intervals of time and computes a firing angle in accordance with the difference between an average input voltage Vm and a reference voltage Vr, the average input voltage Vm representing an average value of several input voltages from the converter 16. This computation, which will be described in detail later, is effected at regular intervals of time. In response to an interruption signal from the programmable interrupt controller 19, the microprocessor 17 converts the computed firing angle to a count y for a programmable timer 20, and it is set in the programmable timer 20. Upon the setting of the count y, as shown in a flowchart of FIG. 2 and waveform diagram of FIG. 3, the programmable timer 20 immediately begins subtractions of the content thereof in response to a chock signal from a clock generator (not shown) and when the content thereof is reduced to zero, produces a pulse. This pulse is shaped by a monostable multivibrator 21, amplified by a transistor 22 and a pulse transformer 23, and applied to the gate of the thyristor 10 as a trigger pulse thereby to fire it. As a result, as shown in FIG. 3, current flows into the field winding 8 through the diodes 9 and 11, and the thyristor 10 during a hatched period of the UW interphase voltage signal and the VW interphase voltage signal. The VW interphase voltage lags behind the UW interphase voltage by 60 degrees, and therefore, assuming that the zero-crossing point of the UW interphase voltage is a synchronous point, the firing angle of the thyristor 10 is capable of being controlled in the range from 0 to 240 degrees. Actually, however, the voltage regulation is not so effective in the range below 40 degrees or higher than 200 degrees, so that the minimum and maximum values of the firing angle are determined at about 40 and 200 degrees respectively.

Figure 4:
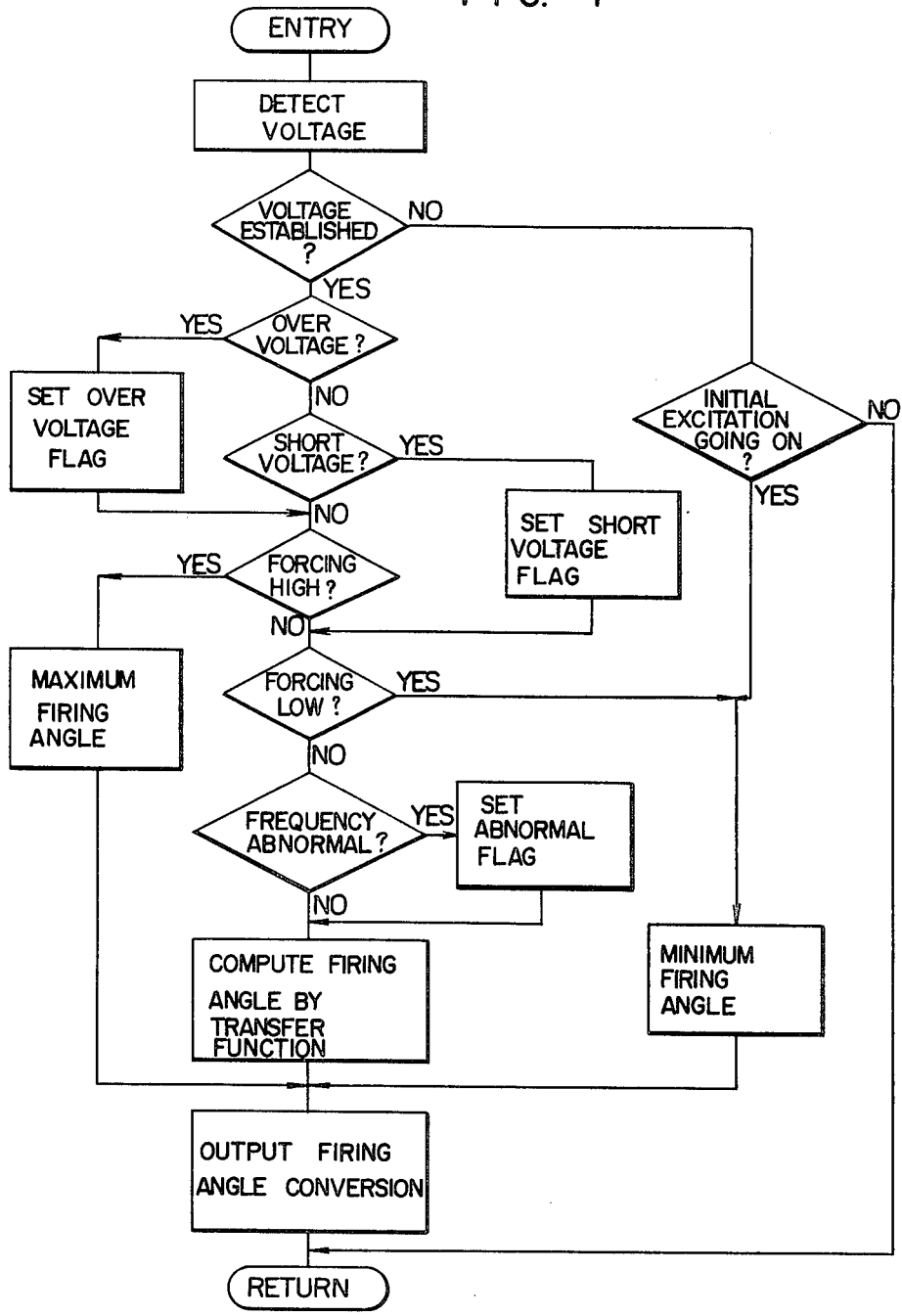
FIG. 4 is a flowchart for computing the firing angle by the microprocessor.

A flowchart for operation by the microprocessor 17 is shown in FIG. 4. By taking an average of the voltages applied from the A/D converter 16 for several times, the average input voltage Vm is obtained. It is decided whether the voltage is established at this average input voltage value Vm. And if the answer is "No", it is further decided whether or not the initial excitation is proceeding. If the answer is "No", no computation is made. If the answer is "Yes", on the other hand, the process proceeds to "Forcing low?". When the voltage is established at the average input voltage voltage is established at the average input voltage value Vm, it is decided whether an over voltage or a short voltage is involved, and an over voltage flag or a short voltage flag, as the case may be, is set, so that the process is passed to "Forcing high?" or "Forcing low?". At "Forcing high?", if the average input voltage Vm is higher than the upper limit Vmax of a predetermined range, the firing angle is forcibly computed to a maximum value predetermined at around 200 degress. At "Forcing low?", on the other hand, if the average input voltage Vm is lower than the lower limit Vmin of the predetermined range, the firing angle is forcibly determined to a minimum value predetermined at around 40 degrees. In the case where the average input voltage Vm is within the predetermined range, by contrast, the frequency is checked to see that it is not abnormal and the firing angle is computed on the basis of a transfer function. A transfer function of an automatic voltage regulation system including an analog circuit is generally expressed by $$K(1+T_2S)/(1+T_1S)$$

where K is a proportionality gain, $T_1$, $T_2$ time constants and S a complex number.

Figure 5:
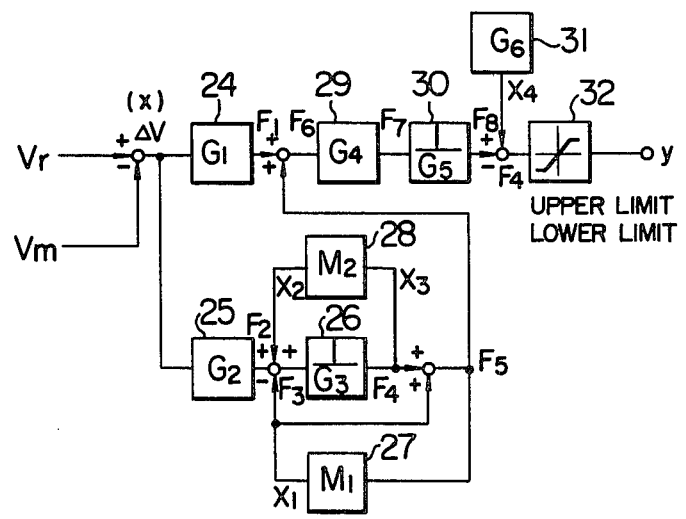
FIG. 5 is a block diagram showing an example of computation based on transfer function by the microprocessor.

In order to obtain a value equivalent to the equation above, the microprocessor 17 uses operation blocks as shown in FIG. 5. Vr designates a reference voltage; $\Delta V$ is an error; $G_1$ is $K \cdot T_2/T_1$; $G_2$ is $K(1-T_2/T_1)$; $G_3$ is $T_1/\Delta T$; $\Delta T$ is an operation interval; $M_1$ is a stored value of a signal $F_5$ for the preceding operation; $M_2$ is a stored value of an excess ($X_3$); $G_4$, $G_5$ conversion constants for converting the signal $F_6$ (no unit) to a count of the programmable timer 20 by multiplication and division since fractional computation is impossible. $G_6$ designates a count value of the reference voltage. Numerals 24, 25 designate proportional elements of zero order, numeral 26 a phase lead element, numeral 27 a lead-lag storage memory, numeral 28 a division error correction memory, 29, 30, 31 a proportional element of zero order, numeral 32 a limiter, $F_1$ to $F_9$, $X_1$ to $X_4$ signals, $X_5$ an upper limit value and $X_6$ a lower limit value.

If $x = Vr - Vm$, and y is an output, $$y = K \frac{1 + T_2S}{1 + T_1S} x$$

$$y(1 + T_1S) = K(1 + T_2S)x$$

Assuming that $S = 1/\Delta T$ and that the n-th output and input are $y_n$ and $x_n$ and the (n−1)th output and input are $y_{n-1}$ and $x_{n-1}$.

$$y_n + T_1 \frac{y_n - y_{n-1}}{\Delta T} = Kx_n + KT_2 \frac{x_n - x_{n-1}}{\Delta T}$$

$$y_n = \frac{\Delta T}{T_1} \left\{ Kx_n + K \frac{T_2}{\Delta T} (x_n - x_{n-1}) - y_n \right\} + y_{n-1}$$

Into this equation are substituted $$y_n = K \frac{T_2}{T_1} x_n + M_{1n} \approx K \frac{T_2}{T_1} x_n + M_{1(n-1)} \text{ and}$$

$$y_{n-1} = K \frac{T_2}{T_1} x_{n-1} + M_{1(n-1)}$$

Thus $$y_n = \frac{\Delta T}{T_1} \left\{ Kx_n + K \frac{T_2}{\Delta T} (x_n - x_{n-1}) - K \frac{T_2}{T_1} x_n - M_{1(n-1)} \right\} + K \frac{T_2}{T_1} x_{n-1} + M_{1(n-1)}$$

-continued $$= K \frac{T_2}{T_1} x_n + \frac{\Delta T}{T_1} \left\{ K \left( 1 - \frac{T_2}{T_1} \right) x_n - M_{1(n-1)} \right\} + M_{1(n-1)}$$

Since $$K \frac{T_2}{T_1} = G_1, K \left( 1 - \frac{T_2}{T_1} \right) = G_2, \frac{\Delta T}{T_1} = \frac{1}{G_3}, \text{ and}$$

$$M_{1(n-1)} = M_1,$$

operation blocks as shown in FIG. 5 are obtained.

Figure 6:
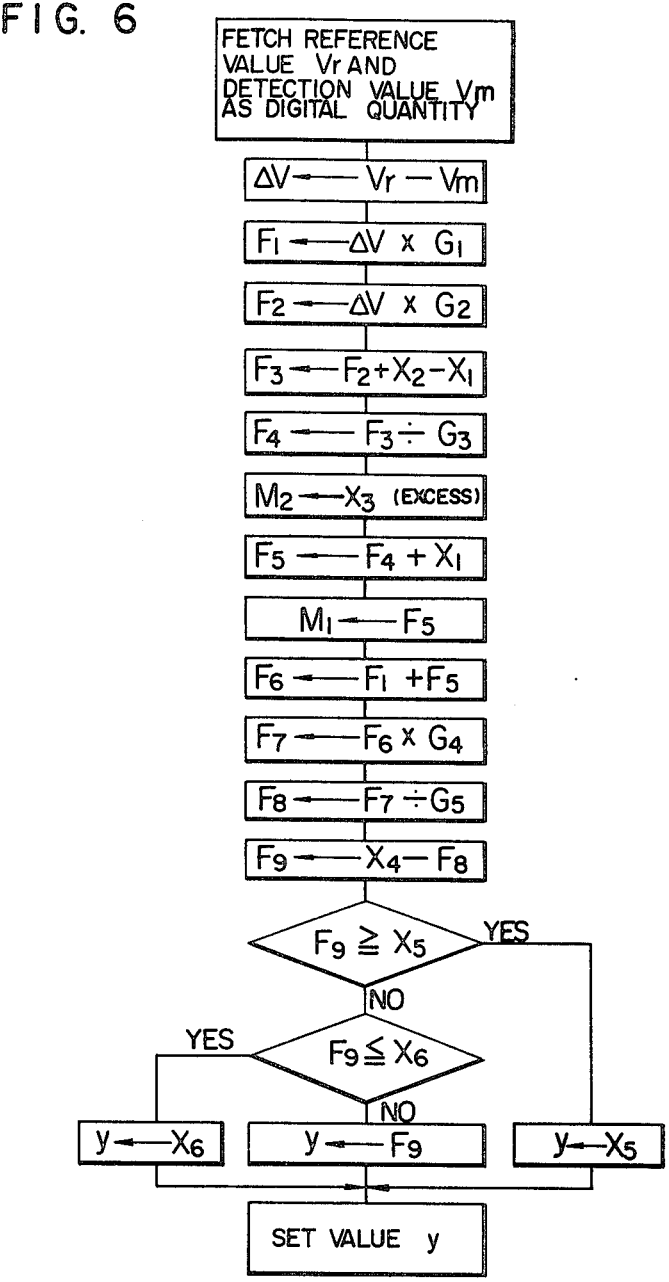
FIG. 6 is a flowchart for this computation.

A flowchart for the operation blocks of FIG. 5 is shown in FIG. 6. By the computation of a firing angle by the microprocessor 17, a firing angle y converted into a count for the programmable timer 20 is produced. A limiter 32 is for determining the minimum and maximum values of the firing angle y. Unless the minimum value and the maximum value of the firing angle y are not set by the limiter 32, the firing angle y may not be covered by the firing angle range ($0° < y < 240°$) thereby making the thyristor 10 inoperable.

Against a voltage variation under steady conditions, the above-mentioned computation of firing angle based on the transfer function is performed; while against a sharp voltage variation at the time of loading or unloading of a load, the minimum and maximum values are forcibly determined without computation of the firing angle based on the transfer function. Under steady conditions, therefore, a superior automatic voltage regulation taking a lead-lag into consideration is performed, and normal conditions are rapidly attained at the time of start or transient response.

Figure 7:
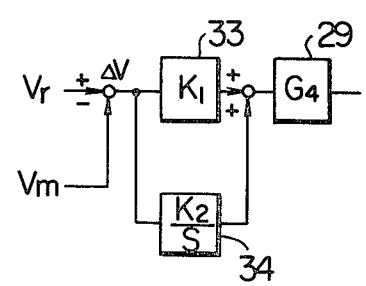
FIG. 7 is a block diagram showing another example of computation based on transfer function by the microprocessor.

The operation blocks for the transfer function are not limited to those shown in FIG. 5, but may take another form shown in FIG. 7. The transfer function $K(1+T_2S)/(1+T_1S)$ of an analog circuit is substantially determined by a proportional element and a first-order lag element. An approximate value therefore is determined by simulation by combination of a proportional element 33 and a first-order lag element 34.

The average input voltage Vm may be either an average of the input voltages received for a predetermined length of time or an exponential average based on the immediately preceding input voltage.

The present invention is applicable not only to a three-phase AC generator but also to a single-phase AC generator.

It will be understood from the foregoing description that according to the present invention, a firing angle is computed by a microprocessor and when a synchronous point is detected, the firing angle is produced to fire the thyristor at the particular firing angle, thus simplifying the circuit. Also, a circuit constant may be set only by change of software, and therefore the circuit constant can be changed very easily, thereby greatly facilitating the standardization of hardware.

What is claimed is

1. In an automatic voltage regulation system for an AC generator, having voltage detector means for detecting an output voltage of the AC generator and a thyristor for controlling the field current in accordance with the difference between a reference voltage and the voltage detected by said detector means, said automatic voltage regulation system further comprising:

synchronous point detector means for detecting a synchronous point of the output voltage of said AC generator;

a microprocessor for computing a firing angle of said thyristor in accordance with the difference between said reference voltage and the voltage detected by said voltage detector means and producing a signal representing the computed firing angle at the time of detection of the synchronous point; and firing control means for turning on said thyristor in response to the firing angle signal at the firing angle computed by said microprocessor.

2. An automatic voltage regulation system for an AC generator according to claim 1, wherein said microprocessor is constructed in a manner that in the case where the voltage detected by said voltage detector means is within a predetermined range, said firing angle is computed by a transfer function including a lead-lag; in the case where said voltage is higher than said predetermined range, the firing angle is forcibly computed to a predetermined maximum value; and in the case where said voltage is lower than said predetermined range, the firing angle is computed forcibly to a predetermined minimum value.

3. An automatic voltage regulation system for an AC generator according to claim 1, wherein said synchronous point detector means includes a comparator for detecting the zero-crossing point of the interphase voltage of said AC generator as a synchronous point, and a programmable interrupt controller for generating an interrupt signal in response to a detection output of said comparator and applying said interrupt signal to said microprocessor.

4. An automatic voltage regulation system for an AC generator according to claim 1, wherein said firing control means includes a programmable timer for counting the time of the firing angle produced from said microprocessor and producing a pulse upon the lapse of said time, and a pulse transformer for amplifying the pulse of said programmable timer and applying said pulse to the gate of said thyristor.

5. An automatic voltage regulation system for an AC generator according to claim 1, wherein said AC generator is a three-phase AC generator and said comparator detects the zero-crossing point of one interphase voltage of said three-phase AC generator as a synchronous point.

* * * * *